(12) United States Patent
Balasaygun et al.

(10) Patent No.: US 9,426,421 B2
(45) Date of Patent: Aug. 23, 2016

(54) SYSTEM AND METHOD FOR DETERMINING CONFERENCE PARTICIPATION

(71) Applicant: Avaya Inc., Santa Clara, CA (US)

(72) Inventors: Mehmet Balasaygun, Freehold, NJ (US); Jon Silverman, Minneapolis, MN (US); John Buford, Princeton, NJ (US)

(73) Assignee: Avaya Inc., Santa Clara, CA (US)

( * ) Notice: Subject to any disclaimer, the term of this patent is extended or adjusted under 35 U.S.C. 154(b) by 64 days.

(21) Appl. No.: 14/478,640

(22) Filed: Sep. 5, 2014

(65) Prior Publication Data

US 2016/0073054 A1 Mar. 10, 2016

(51) Int. Cl.
| | |
|---|---|
| H04N 7/15 | (2006.01) |
| H04M 3/56 | (2006.01) |
| H04L 29/08 | (2006.01) |
| H04L 29/06 | (2006.01) |

(52) U.S. Cl.
CPC ............... *H04N 7/15* (2013.01); *H04L 65/403* (2013.01); *H04L 67/22* (2013.01); *H04M 3/568* (2013.01)

(58) Field of Classification Search
USPC ...................................................... 348/14.08
See application file for complete search history.

(56) References Cited

U.S. PATENT DOCUMENTS

| | | | |
|---|---|---|---|
| 9,178,933 B1* | 11/2015 | Soland ..................... | H04L 67/02 |
| 2009/0027485 A1 | 1/2009 | Erhart et al. | |
| 2014/0022096 A1* | 1/2014 | Agarwal ........... | G06F 17/30702 340/995.27 |
| 2015/0099255 A1* | 4/2015 | Aslan ....................... | G09B 5/08 434/350 |
| 2015/0106191 A1* | 4/2015 | Ge ..................... | G06Q 30/0275 705/14.45 |
| 2015/0220814 A1* | 8/2015 | Verkasalo ............ | G06K 9/6262 382/103 |

OTHER PUBLICATIONS

"YuMe Enhances First Party Data-Driven Approach to Targeting, Measuring both Audience Receptivity and Attentiveness," YuMe, Inc., Redwood City, CA, Nov. 13, 2013.
"Transforming Data into Performance. Blackboard Analytics Value Proposition," blackboardanalytics.com, 1997-2011, pp. 1-2.
"How is the interest/attentiveness rating measured?" Citrix Online, LLC, 2012.

* cited by examiner

*Primary Examiner* — Creighton Smith
(74) *Attorney, Agent, or Firm* — Sheridan Ross P.C.

(57) ABSTRACT

Disclosed herein are systems, methods, and computer-readable storage media for tracking engagement of participants in a presentation. An example system implementing the method can identify a presenter in a conference and participants in the conference. Then the system can gather, during a presentation by the presenter in the conference, engagement data about the participants. The system can generate or calculate an engagement score based on the engagement data, and present the engagement score to the presenter during the presentation. The system can gather the engagement data from participant devices through which the participants are accessing the presentation or from other participant devices not directly involved with the presentation. The engagement data can include participant voice activity in the conference, participant voice activity with others outside of the conference, participant audio data, participant video data, participant mute status, participant interactions with other applications, participant interactions with computing devices and participant multi-tasking.

20 Claims, 5 Drawing Sheets

SYSTEM AND METHOD FOR DETERMINING CONFERENCE PARTICIPATION

BACKGROUND

1. Technical Field

The present disclosure relates to gauging conference call participation and more specifically to determining conference call participation in real-time based on audio and additional inputs.

2. Introduction

Existing conferencing solutions provide no measure or real-time feedback of effectiveness of a conference call. Many conferencing solutions provide abilities to record conference calls, (including web sessions) or otherwise gather data generated by or describing conference calls, but a user must then manually inspect or analyze the recordings and gathered data to measure or estimate call participants' engagement as a means of determining the effectiveness of the call. Manual analysis of participation has three primary drawbacks. First, manual analysis is time-intensive and does not scale well. Second, manual analysis requires attention from one of a specific group of people that understand the context of the conference call. Third, manual analysis of recorded conference calls cannot provide real time feedback.

Some solutions provide real-time feedback on effectiveness of communication, such as platforms that automatically detect pre-provisioned key phrases in recorded speech files. Such a platform can then provide real-time data to a contact center supervisor, for example. However, this approach is limited to audio recordings, and does not consider additional sensory inputs when generating feedback or an automatic rating on the effectiveness of a conference call. All current conferencing solutions fail to provide real-time feedback to conference presenters/moderator. Some conferencing systems can provide real-time active speaker data which can complement voice-activated switching of a video stream or active participant rendering around a video frame in multi video streaming systems.

DETAILED DESCRIPTION

Figure 1:
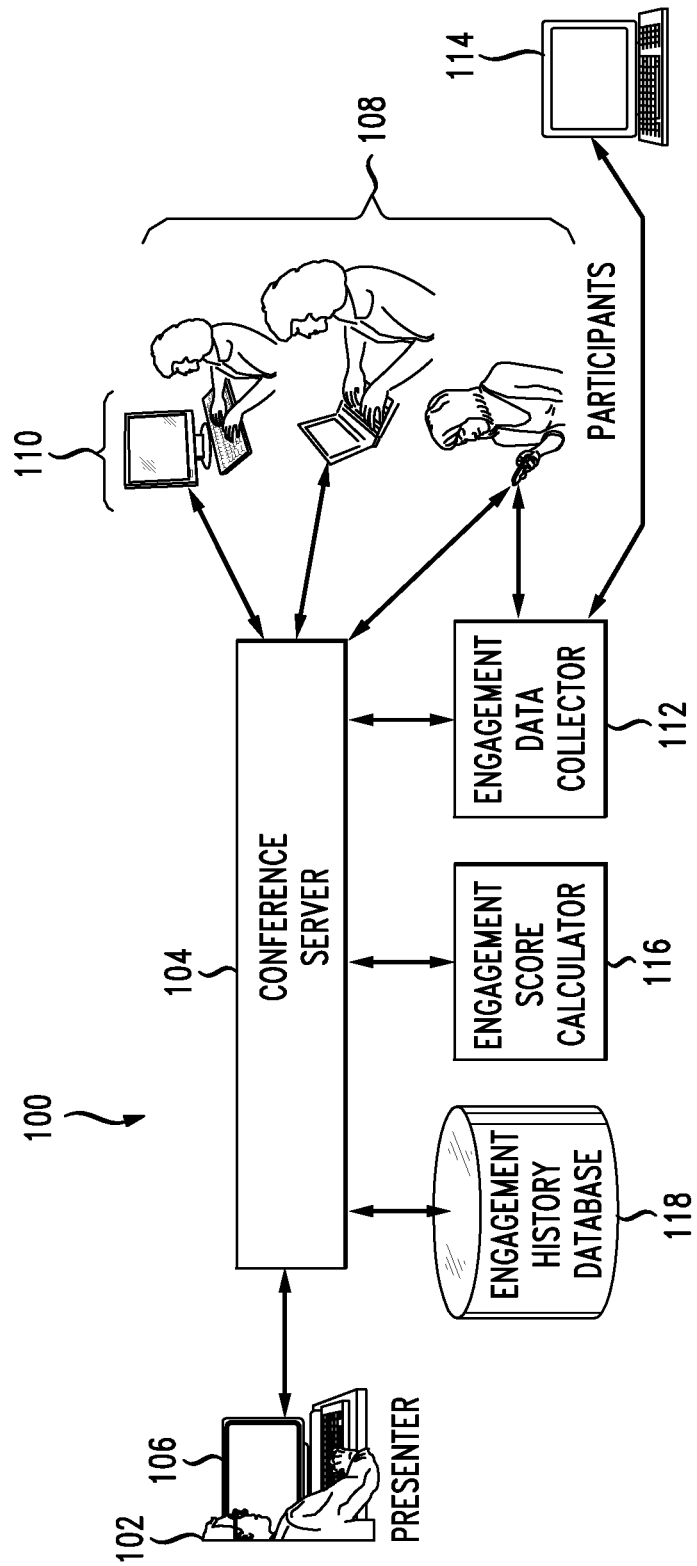
FIG. 1 illustrates an example conference system for gathering, storing, and reporting engagement data about participants.

A system, method and computer-readable media are disclosed for tracking engagement of participants in a presentation. An example system implementing the method can identify a presenter in a conference and participants in the conference. Then the system can gather, during a presentation by the presenter in the conference, engagement data about the participants. The system can generate or calculate an engagement score based on the engagement data, and present the engagement score to the presenter during the presentation. The system can gather the engagement data from participant devices through which the participants are accessing the presentation or from other participant devices not directly involved with the presentation. The engagement data can include participant voice activity in the conference, participant voice activity with others outside of the conference, participant audio data, participant video data, participant mute status, participant interactions with other applications, participant interactions with computing devices, participant multi-tasking, participant gaze, participant visual focus, participant physical state, participant mental state, and participant emotional state.

The conferencing solutions set forth herein can gather rich data from one or more participants anonymously and use this information to gauge effectiveness of communication. The system can require or request permission from participants to gather engagement data, or can provide a notice that permission to gather such engagement data is a prerequisite for joining the conference or presentation.

An example conference effectiveness metrics system or engagement measurement system automatically measures effectiveness of a call by collecting information from or about participants and from the conferencing infrastructure. The system can collect information about participants anonymously or with associated complete or partial identity information. This approach can automatically determine the effectiveness or usefulness of a conference call, as measured by engagement data describing how engaged (or conversely how distracted) participants are in a conference or presentation. This metric can provide value to enterprises in several real life use cases. For example, the system can provide a real-time display of participation or engagement to a professor or educator during a lecture. The lecture can be a webcast or telepresence lecture, or even an in-person lecture. Then the professor can use that feedback to change the way the lecture is being presented in order to engage the listeners more. In a different example use case, a team leader can use feedback from the system regarding conference participation or engagement to manage enterprise communication quality for team collaboration, or to generate team communication quality reports. This information can be used to tune/adjust how teams coordinate, actions of team leaders, effectiveness of meetings, and so forth. In yet another example use case, the system can provide presentation analytics that salespeople can then use to improve sales communications with clients. Yet another use case example is an offline "coach" which presents metrics of sales calls and compares those metrics with benchmark data of sales high-performers. In this way, a salesman can evaluate his or her performance and drill down to specific details of during which aspects of a presentation attention or engagement dropped. Similarly, the system can extend to serve as a sales management tool to view and compare sales meeting metrics of different teams, compare high performers with the rest of teams, correlate sales data, and maintain a database of meetings data for historical comparison. The system can provide real-time feedback to a sales team or sales managers, or can compare or identify speech metrics of high sales performers correlated with historical data.

The system gathers participation or engagement information from conference participants to algorithmically determine their level of participation. The types of data gathered can vary based on the type of participants, the types of devices around the participants, the type of presentation, whether participants are in a group or located separately, and so forth. Further, the algorithm to determine the level of participation or engagement can be weighted based on demographic or social data. For example, different people show participation differently, and a Canadian teenage boy may manifest his level of engagement in the presentation differently from a German middle-aged woman. On an even more specific level, the system can learn and adapt to specific users' tendencies and idiosyncrasies to demonstrate his or her level of engagement.

The system can gather data to automatically rate participants' level of engagement of participation. The data can be gathered from one or more sources, such as any of the input modalities of a client device for accessing the conference, including a camera, microphone, keyboard, mouse, touchpad, accelerometers, geo-positioning sensors, and so forth. The system can use data such as local voice activity detection, typing activity, interactions with a touchscreen other than with an application associated with the conference, speaking while muted, and so forth. The system can also gather data from other communication activities such as a user placing the call on hold or talking to someone else in the room while the conference call is muted, a user instant messaging with other participants on conference call or with others who are not on the conference call, user multitasking for activities unrelated to the conference, user multitasking for activities that are related to the conference call (such as reading the earlier slides in the presentation or documents referenced in the presentation), and a user presenting on the conference call. The system can gather certain data (or infer certain data) via speech analytics or speaker sentiment analysis.

In one variation, the system collects data from participants anonymously, to avoid infringement on participants' privacy. In certain situations, the system can warn users that data will be collected. For example, if fewer than a threshold number of participants are present, the system can warn about data collection. The system can allow users to opt in to data collection in conjunction with the warnings. When an insufficient number of participants is present such that the identities of participants can be guessed or inferred, the system can automatically disengage data collection and analysis as an optional feature.

With a great volume of data received and processed, the system may sometimes encounter data that is either meaningless to the participation or engagedness metric, or that indicates the opposite of what is desired. Thus, the system can filter out "false activities," such as cross talk or background noise on the call. For example, the system can use a noise detection algorithm to detect a background noise level from participants' devices, and not report that background noise activity as active talking. Similarly, the system can filter out a very short burst of audio input from a participant, which may correspond to repositioning the telephone, or to a cough or sneeze, for example. Any of a conference server, a client device, or an edge device connected to the conference server can perform the filtering.

The system can determine each participant's participation level based on the information collected from these various sources. The participation level or engagement score can change dynamically as the conference continues. In one example scoring scheme, the participation level or engagement score starts at 0 (meaning no active participation) and goes up to 100 (meaning the most active participation such as intently listening to an interesting topic during on a lecture mode conference call). The system can collect this data from soft clients or telephones connected to the conference. In one example, the various client devices or soft clients publish data to conferencing system, and in another example, the conferencing system requests the data from the clients or pulls the data from the client. The conferencing system can collect some of the data without explicit cooperation of the clients, such as active talker detection at a mixer level. Similarly, the conferencing system can filter out talk over, background noise, short bursts of audio, and so forth.

The conferencing system can dynamically calculate the participation or engagement rate of each participant and publish it to the presenter, the participant, and/or to other conference participants. For example, the conferencing system can publish the raw participation or engagement data to participants so participants' devices can perform their own analyses. The system can publish or share an overall average and time-windowed view to "participation level" to participants to provide an aggregate (or time-windowed) view of communication effectiveness or of participant engagedness. For example, in a lecture environment, such a summary view can help a lecturer change course on the fly and present the topic in a different way, perhaps by asking questions to engage participants on the call. After this change of course, a time-windowed view of overall participation level can provide feedback to the lecturer whether his or her changes improved the engagement rate of the call. Fine-grained views can even indicate which changes were more effective with which individual participants or groups of participants for increasing participation.

Thus, the system can display overall conference participant engagement, such as on a presentation or conference call. The system can present the overall conference participant engagement as a gauge showing an aggregate summary of attentiveness on a conference call. The system can generate an alert or notification to presenter if the level of participation drops below a desired threshold, allowing the presenter to make changes on the fly to re-engage participants. The system can also collect conference participation data from multiple conference calls over time to build a historical reference database. Such a database can then be used to create a more effective business environment in certain business cases such as sales, marketing, or training.

The system can enable three main new functionalities, as well as others. The system can provide to a presenter an aggregate score of attentiveness, participation, and/or engagedness of participants as a group or of individual participants. The system enables a presenter to take corrective action in real-time to improve the participation level based on the score. The system can also use the aggregate score to provide post-conference speech analytics so that the presenter (or a different later presenter) can decide how to engage the participants in following presentations. The system can provide an interface for a presenter (or other users) to review historical conference participation data to complement a process by which cross-organization communication is evaluated. For example, via the interface users can determine whether departments within an organization communicate effectively with each other. User can access, via the interface, historical data to determine why certain sales are better contributors than others. Speech analytics data can provide additional insight into trends and effective contribution of salespeople. Thus, the system can enable not only real-time feedback to a presenter or to others on the conference, but can also enable metrics for post-conference analysis and decision making.

FIG. 1 illustrates an example conference system 100 for gathering, storing, and reporting engagement data about participants. In this system 100, the presenter 102 communicates with a conference server 104 via a presenter device 106, such as a desktop computer, laptop computer, tablet, smartphone, dedicated conferencing device, or other device. Various participants or audience members 108 connect to the conference server 104 via their respective device 110. The conference server can be a centralized server, as depicted in FIG. 1, or similar conference functionality to the conference server can be distributed between several components, including the presenter device 106 and/or client devices 110. The presenter 102 initiates a presentation to the participants 110 via the conference server 104, and an engagement data collector 112 gathers data from the various participant devices 110, whether directly or through the conference server 104. In some situations, the engagement data collector 112 can gather data from other participant devices 114 which are not directly involved in displaying the conference or communicating with the conference server 104. The conference server 104 or the engagement data collector 112 can identify such devices from a previously established participant profile, or as part of a conference enrollment process. The engagement data collector 112 identifies which other devices 114 to monitor and can associate those other devices 114 with specific participants 108. The engagement data collector 112 can be aware of the data gathering capabilities of each device 110, 114, and can request all or part of the available data streams from these devices 110, 114. For example, certain devices may offer a video stream and audio, other devices may offer only audio. The devices may have different level of sensitivity and data granularity, which the engagement data collector 112 can normalize.

As the engagement data collector 112 gathers engagement data from the devices 110, 114, the engagement data collector 112 can store the engagement data in an engagement history database 118. The engagement score calculator 116 can process the engagement data to generate a dynamic engagement score in real-time (or substantially real-time) and display the engagement score to the presenter 102 via the presenter's device 106, and/or to other participants 108 via their respective devices. The conference server 104 can transfer a signal to the various devices 106, 110 embedded in a data stream for the conference, or as a separate signal. The engagement history database 118 can store raw engagement data, and/or can store the resulting engagement scores generated by the engagement score calculator 116. The engagement score calculator 116 or the engagement history database 118 can coordinate with a topic recognizer or agenda tracker to correlate the engagement scores with specific portions of the conference. Then, the conference server 104 or other entity can prepare reports of engagement or attentiveness for a specific conference, for a specific user over several conferences, for a specific group of users, by presentation topic, by presenter, and so forth.

Figure 2:
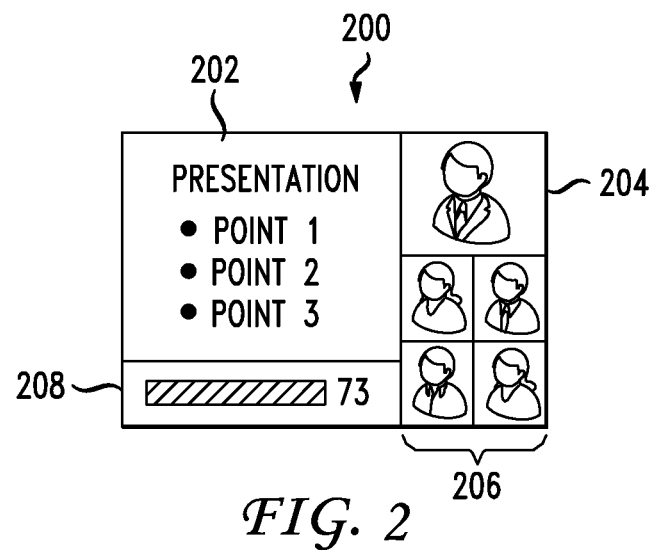
FIG. 2 illustrates an example presenter view of an example conference.

FIG. 2 illustrates an example presenter view 200 of an example conference. In this presenter view 200, the conference is video-enabled, so that the presenter can see his video feed 204, as well as video feeds 206 of others in the conference. The presenter view 200 can include a presentation view 202 such as a presentation slide with images, text, or video. The presenter view 200 can include a visual depiction of the engagement score 208. In this example, the engagement score 208 is depicted as a horizontal thermometer that can dynamically slide left or right to indicate an increasing or decreasing engagement score. The same engagement score 208 can be presented in a number of different graphical and/or non-graphical ways. The presenter view 200 can include a number of different display types for the engagement score, such as a number that changes, a heat map, presenting individual scores by the participants' pictures or names, and so forth.

Figure 3:
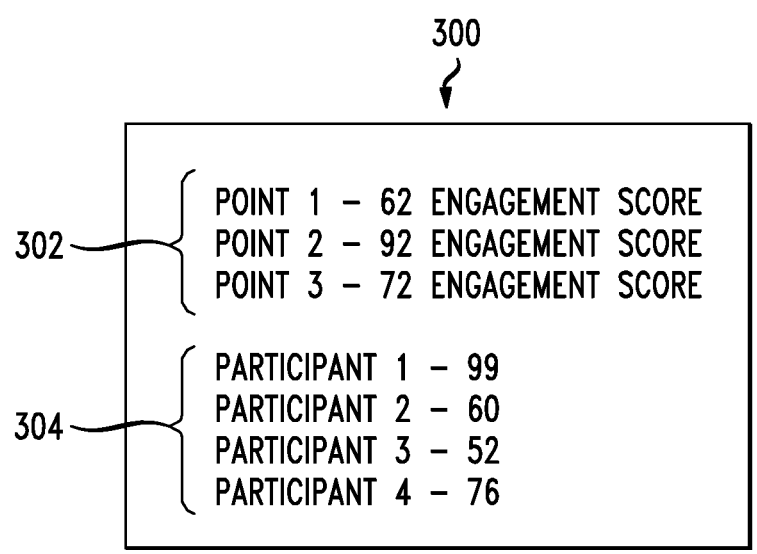
FIG. 3 illustrates a first example engagement summary after an example conference.
Figure 4:
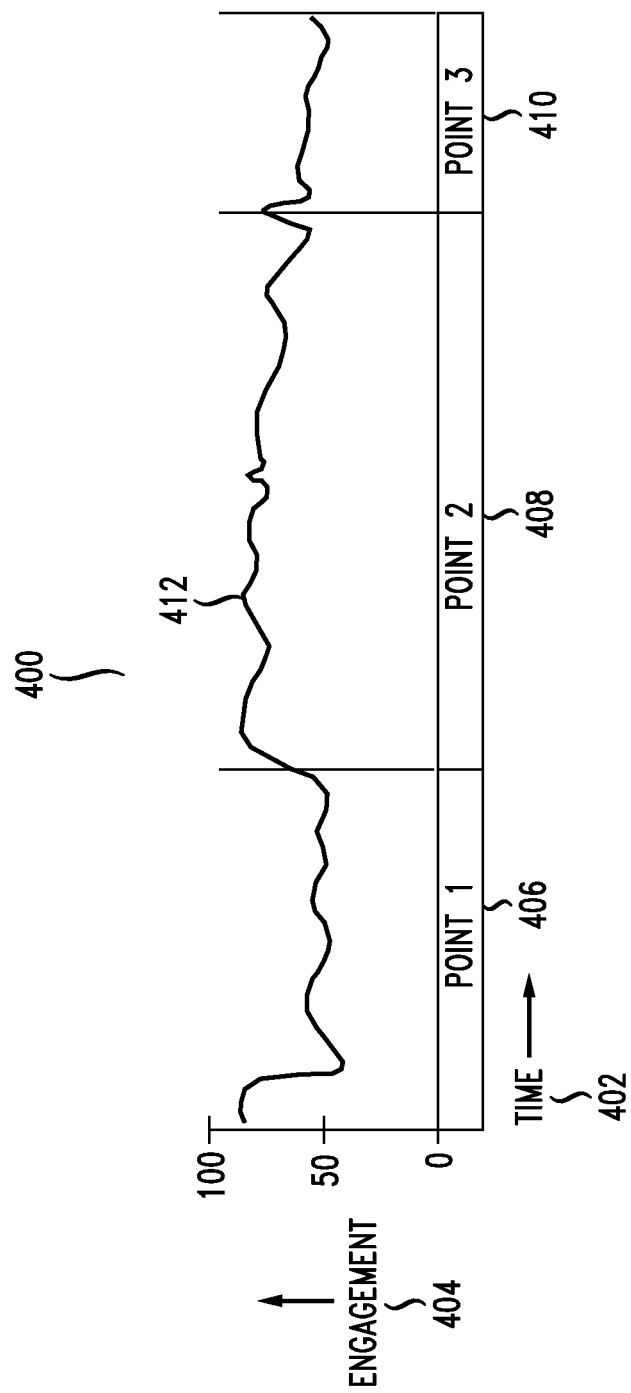
FIG. 4 illustrates a second example engagement summary after an example conference.

FIG. 3 illustrates a first example engagement summary 300 after an example conference. This example summary 300 presents per-topic engagement scores 302 as well as per-participant engagement scores 304. The summary can include interactive portions through which a user can drill down to view more detailed underlying data. The system presenting the summary can also receive queries and return more detailed engagement data or different engagement data according to the query. FIG. 4 illustrates a second example engagement chart 400 after an example conference. Because the system can track engagement or participation in real-time as the conference progresses, the system can provide detailed reports on the participation. In this example chart 400, the x axis 402 represents time and the y axis 404 represents the engagement score. The engagement data is represented as a line 412 on the chart that rises or falls over time to reflect the gathered engagement data. The system can identify topics in the conference, and can associate time stamps with those topics. In this way, the chart 400 can also identify the periods for different topics 406, 408, 410. A user can more easily identify trends and potential causes for the trends in the engagement data with such an organizational structure and with references to topics in the conference. For example, the initial engagement score at the beginning of the first topic 406 was high, then dropped down. At the transition to the second topic 408, the engagement score increased dramatically, then tapered off, perhaps as the primary issues had already been resolved. There was an uptick in the engagement score in the boundary between the second topic 408 and the third topic 410, but the engagement score was relatively low for the majority of the third topic 410, with an uptick towards the end. The system can provide a list of one or more underlying reasons or causes for a change in the engagement score. For example, the system can render tooltips, overlays, or other visual indicators at specific points on the line 412 that the user can interact with to discover the underlying reason or cause of the change.

These example graphical presentations of engagement scores are illustrative examples, and should not be considered limiting. The system can display or present engagement scores in a number of different ways not necessarily outlined herein, including displaying raw numbers, writing engagement scores in a log file, modifying a manually or automatically generated transcript of a conference to reflect the engagement scores, and so forth.

Figure 5:
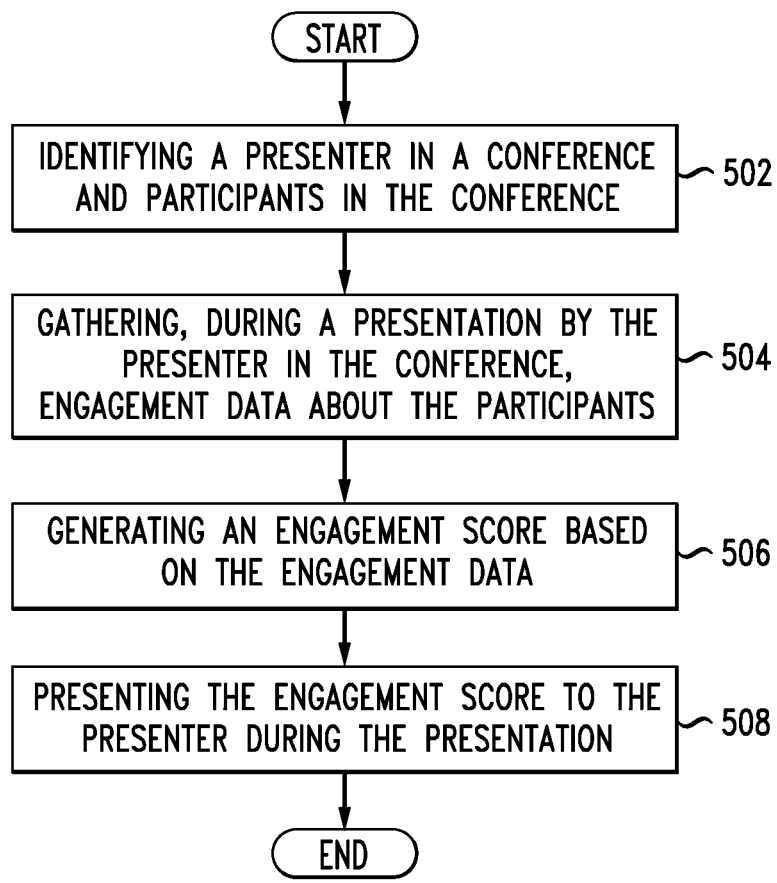
FIG. 5 illustrates an example method embodiment for tracking engagement of participants in a presentation or conference.
Figure 6:
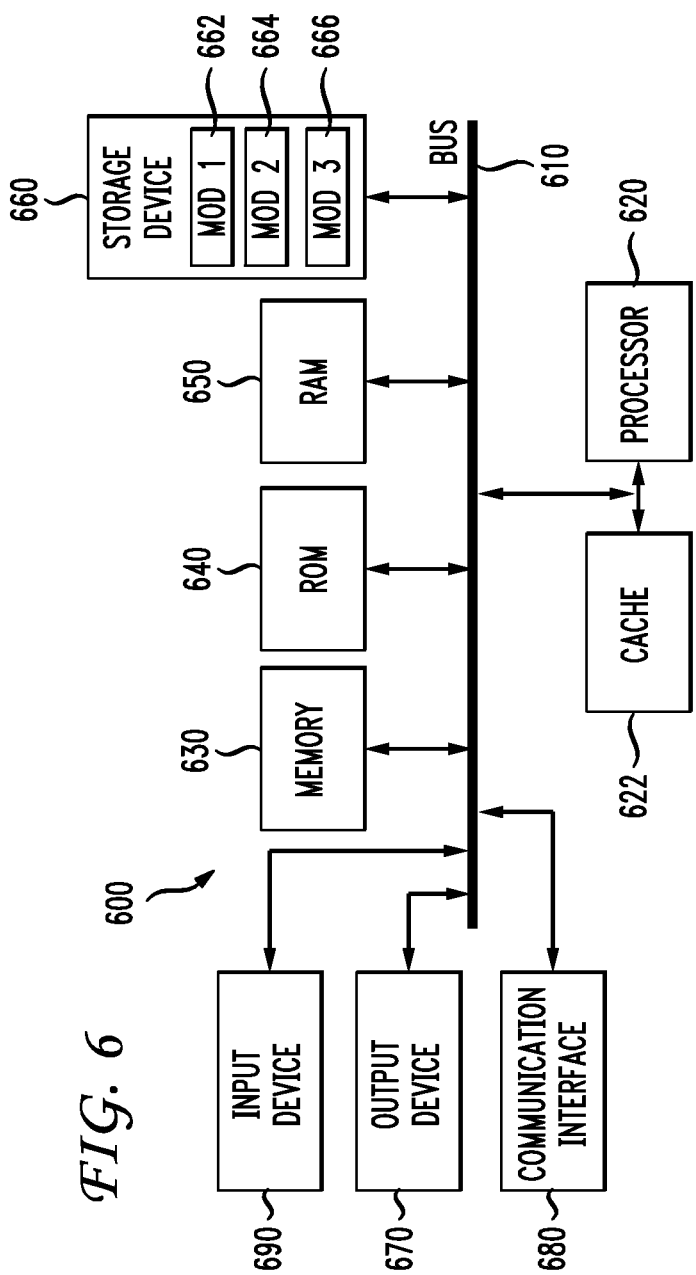
FIG. 6 illustrates an example system embodiment.

Having disclosed some basic system components and concepts, the disclosure now turns to the exemplary method embodiment shown in FIG. 5. For the sake of clarity, the method is described in terms of an exemplary system 600 as shown in FIG. 6 configured to practice the method. The steps outlined herein are exemplary and can be implemented in any combination thereof or in any order, including combinations that exclude, add, reorder, or modify certain steps. FIG. 5 illustrates an example method embodiment for tracking engagement of participants in a presentation or conference. A system, method and computer-readable media are disclosed for tracking engagement of participants in a presentation. An example system implementing the method can identify a presenter in a conference and participants in the conference (502).

Then the system can gather, during a presentation by the presenter in the conference, engagement data about the participants, wherein the engagement data is separate from a media stream of the presenter of the conference (504). The engagement data can be collected, for example, from other sources external to the conference, or that are part of the conference but are not gathering data for the media stream of the presenter. Engagement data can be gathered from a video camera of a participant, for example, even though the participant is not transmitting a video feed to the conference, such as in a web conference. The engagement data from the conference can be gathered in real time with the conference or can be gathered while the participants are watching a recorded conference. The system can gather the engagement data from participant devices through which the participants are accessing the presentation or from other participant devices not directly involved with the presentation. The engagement data can include participant voice activity in the conference, participant voice activity with others outside of the conference, participant audio data, participant video data, participant mute status, participant interactions with other applications, participant interactions with computing devices, participant multi-tasking, participant gaze, participant visual focus, participant physical state, participant mental state, and participant emotional state. The system can gather the engagement data from participant devices through which the participants access the conference, and/or from participant devices other than devices through which the participants access the conference. For example a participant can join the conference via a tablet, and register other nearby devices (manually or automatically) that are not being used to access the conference, such as a desktop computer, a smartphone, a laptop, wearable electronics, or ambient or embedded sensors. Then, the nearby devices can report to a conference server or to an engagement score server. Even though the nearby devices are not directly involved in the conference, users' activities with such devices can provide insight into a level of engagement. For example, if a user is supposed to be actively participating in the conference via the tablet, but is instead playing a game on his smartphone, or simultaneously answering another call on a landline phone, the system can deduce a lower engagement score based on the distracting activity.

The system can generate or calculate an engagement score based on the engagement data (506), and present the engagement score to the presenter during the presentation (508). The engagement score can be an aggregate score for all of the participants, an individual engagement score for one of the participants, or a group engagement score for a subset of similar participants. Prior to generating the engagement score, the system can detect and filter false activities out of the engagement data.

The system can dynamically update the engagement score throughout the presentation. The system can track topics in the presentation, and determine topic-specific engagement scores for each topic from the engagement data. The system can identify a period of low engagement when the engagement score is below a threshold, identify a likely cause of the period of low engagement, and provide to the presenter a suggested change in the presentation to increase the engagement score. The system can identify a period of low engagement when the engagement score is below a threshold, and provide an alert to the presenter about the period of low engagement. The system can present an engagement score summary to the presenter after the conference. The engagement score summary can include a summary of topics during which participants were less engaged.

While specific implementations are described herein, it should be understood that this is done for illustration purposes only. Other components and configurations may be used without parting from the spirit and scope of the disclosure.

A brief description of a basic general purpose system or computing device in FIG. 6 which can be employed to practice the concepts is disclosed herein. With reference to FIG. 6, an exemplary system 600 includes a general-purpose computing device 600, including a processing unit (CPU or processor) 620 and a system bus 610 that couples various system components including the system memory 630 such as read only memory (ROM) 640 and random access memory (RAM) 650 to the processor 620. The system 600 can include a cache 622 of high speed memory connected directly with, in close proximity to, or integrated as part of the processor 620. The system 600 copies data from the memory 630 and/or the storage device 660 to the cache 622 for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 6 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, read only memory (ROM) 640, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal-systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 620. The functions these blocks represent may be provided through the use of either shared or dedicated hardware, including, but not limited to, hardware capable of executing software and hardware, such as a processor 620, that is purpose-built to operate as an equivalent to software executing on a general purpose processor. For example the functions of one or more processors presented in FIG. 6 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 640 for storing software performing the operations described below, and random access memory (RAM) 650 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 600 shown in FIG. 6 can practice all or part of the recited methods, can be a part of the recited systems, and/or can operate according to instructions in the recited tangible computer-readable storage media. Such logical operations can be implemented as modules configured to control the processor 620 to perform particular functions according to the programming of the module. For example, FIG. 6 illustrates three modules Mod1 662, Mod2 664 and Mod3 666 which are modules configured to control the processor 620. These modules may be stored on the storage device 660 and loaded into RAM 650 or memory 630 at runtime or may be stored in other computer-readable memory locations.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
   identifying, by a microprocessor, a presenter device used by a presenter in a conference and participant devices through which participants access the conference;
   gathering, by the microprocessor, during a presentation by the presenter in the conference, engagement data about the participants, wherein the engagement data is separate from a media stream of the presenter of the conference;
   generating, by the microprocessor, an engagement score based on the engagement data;
   sending, by the microprocessor, the engagement score for presentation to the presenter using the presenter device during the presentation;
   identifying, by the microprocessor, a period of low engagement when the engagement score is below a threshold; and sending, by the microprocessor, an alert to the presenter device about the period of low engagement.

2. The method of claim 1, wherein the engagement data comprises one of participant voice activity in the conference, participant voice activity with others outside of the conference, participant audio data, participant video data, participant mute status, participant interactions with other applications, participant interactions via a human interface device for a computer, participant multi-tasking, how strongly the participant multi-tasking relates to the conference, participant role in the conference, participant gaze, participant visual focus, participant physical state, participant mental state, or participant emotional state.

3. The method of claim 1, further comprising:
prior to generating the engagement score, detecting and filtering, by the microprocessor, false activities out of the engagement data.

4. The method of claim 1, further comprising:
dynamically updating, by the microprocessor, the engagement score throughout the presentation.

5. The method of claim 1, further comprising:
tracking, by the microprocessor, topics in the presentation; and
determining, by the microprocessor, topic-specific engagement scores for each topic from the engagement data.

6. The method of claim 1, further comprising:
identifying, by the microprocessor, a likely cause of the period of low engagement; and
sending to the presenter device a suggested change in the presentation to increase the engagement score.

7. The method of claim 1, wherein the engagement score is an aggregate score for all of the participants.

8. The method of claim 1, wherein the engagement score is an individual engagement score for one of the participants.

9. The method of claim 1, wherein the engagement score is a group engagement score for a subset of similar participants.

10. The method of claim 1, further comprising:
sending, by the microprocessor, an engagement score summary to the presenter device after the conference.

11. The method of claim 10, wherein the engagement score summary comprises a summary of topics during which the participants were less engaged.

12. The method of claim 1, wherein the engagement data is gathered from the participant devices through which the participants access the conference.

13. The method of claim 1, wherein the engagement data is gathered from participant devices other than the participant devices through which the participants access the conference.

14. A system comprising:
a microprocessor; and
a computer-readable storage device storing instructions which, when executed by the microprocessor, cause the microprocessor to perform operations comprising:
identifying a presenter device used by a presenter in a conference and a participant device through which a participant accesses the conference;
gathering, during a presentation by the presenter in the conference, engagement data about the participant, wherein the engagement data is separate from a media stream of the presenter of the conference;
generating an engagement score based on the engagement data;
sending the engagement score for presentation to the presenter using the presenter device during the presentation;
identifying a period of low engagement when the engagement score is below a threshold; and
sending an alert to the presenter device about the period of low engagement.

15. The system of claim 14, the computer-readable storage device storing instructions which, when executed by the microprocessor, cause the microprocessor to perform operations further comprising:
prior to generating the engagement score, detecting and filtering false activities out of the engagement data.

16. The system of claim 14, the computer-readable storage device storing instructions which, when executed by the microprocessor, cause the microprocessor to perform operations further comprising:
dynamically updating the engagement score throughout the presentation.

17. The system of claim 14, the computer-readable storage device storing instructions which, when executed by the microprocessor, cause the microprocessor to perform operations further comprising:
identifying a likely cause of the period of low engagement; and
sending to the presenter device a suggested change in the presentation to increase the engagement score.

18. The system of claim 14, wherein the engagement score is an aggregate score for all of the participants.

19. The system of claim 14, the computer-readable storage device storing instructions which, when executed by the microprocessor, cause the microprocessor to perform operations further comprising:
sending an engagement score summary to the presenter device after the conference, wherein the engagement score summary comprises a summary of topics during which the participants were less engaged.

20. The system of claim 14, wherein the engagement data is gathered from participant devices other than the participant devices through which the participants access the conference.

* * * * *